(12) United States Patent
Orfali

(10) Patent No.: US 6,651,153 B1
(45) Date of Patent: Nov. 18, 2003

(54) METHODS FOR PREDICTING CACHE MEMORY PERFORMANCE IN A PROPOSED COMPUTER SYSTEM

(75) Inventor: Marwan F. Orfali, Woodbury, MN (US)

(73) Assignee: Unisys Corporation, Blue Bell, PA (US)

( * ) Notice: Subject to any disclaimer, the term of this patent is extended or adjusted under 35 U.S.C. 154(b) by 408 days.

(21) Appl. No.: 09/784,933

(22) Filed: Feb. 16, 2001

(51) Int. Cl.[7] .............................................. G06F 12/00
(52) U.S. Cl. ...................... 711/170; 711/133; 711/159
(58) Field of Search ................. 711/133, 159, 711/170

(56) References Cited

U.S. PATENT DOCUMENTS

| | | | |
|---|---|---|---|
| 5,088,058 A | 2/1992 | Salsburg | 364/500 |
| 5,452,440 A | 9/1995 | Salsburg | 395/463 |
| 5,586,303 A | 12/1996 | Willenz et al. | 395/497.03 |
| 5,615,357 A | 3/1997 | Ball | 395/500 |
| 5,815,688 A | 9/1998 | Averill | 395/500 |
| 5,845,106 A | 12/1998 | Stapleton | 395/500 |
| 5,894,575 A | 4/1999 | Levine et al. | 395/704 |

OTHER PUBLICATIONS

IBM TDB, "Scheme for Producing Miss–Rate As a Function of Cache Size By Means of Traces Produced by Observing Misses From a Cache of Fixed Size", vol. 33, issue 11, pp. 36–39, Apr., 1, 1991.*
IBM TDB, "Optimal Allocation of Cache Memory Among Competing Processes", vol. 31, issue 8, pp. 143–146, Jan. 1, 1989.*

* cited by examiner

Primary Examiner—Jack A. Lane
(74) Attorney, Agent, or Firm—Charles A. Johnson; Mark T. Starr; Crompton Seager & Tufte, LLC

(57) ABSTRACT

Methods and systems are provided for efficiently predicting the performance of a proposed cache memory within a proposed computer system. A number of actual cache memory performance values are first measured using a number of actual computer systems with various cache memory sizes and various processing capabilities. Once a sufficient number and variety of average actual cache memory performance values are measured, a predicted average cache memory performance value is calculated for the proposed cache memory size. This is preferably accomplished by extrapolating from selected average actual cache memory performance values. It is contemplated that contributions from various cache memory request types may be individually addressed.

30 Claims, 5 Drawing Sheets

|  | NUMBER OF IP's | | | | | |
|---|---|---|---|---|---|---|
| CACHE SIZE (MB) | 1 | 2 | 4 | 8 | 16 | 32 |
| 0.5 | X | + | X | + | + | + |
| 1.0 | X | + | X | + | + | + |
| 2.0 | X | X | X | + | + | + |
| 4.0 | + | + | + | + | + | + |
| 8.0 | + | + | + | + | + | + |
| 16.0 | + | + | + | + | + | + |
| 32.0 | + | + | + | + | + | + |

*FIG. 4*

CACHE REQUEST TYPE

INSTRUCTION FETCH
DATA READ WITHOUT OWNERSHIP
DATA READ WITH OWNERSHIP
OWNERSHIP REQUEST

CACHE MANAGEMENT FUNCTIONS

CACHE HIT RETURN FUNCTION
CACHE FLUSH FUNCTION

METHODS FOR PREDICTING CACHE MEMORY PERFORMANCE IN A PROPOSED COMPUTER SYSTEM

CROSS-REFERENCE TO CO-PENDING APPLICATIONS

This application is related to U.S. patent application Ser. No. 09/790,627, filed Feb. 16, 2001, entitled "Method for Predicting Instruction Execution Efficiency in a Proposed Computer System", U.S. patent application Ser. No. 09/747,050, filed Dec. 21, 2000, entitled "System and Method for High Speed, Low Cost Address and Bus Signal Tracing", U.S. patent application Ser. No. 09/745,813, filed Dec. 21, 2000, entitled "High Speed Processor Interconnect Tracing Compaction Using Selectable Triggers", and U.S. patent application Ser. No. 09/747,046, filed Dec. 21, 2000, entitled "Coordination of Multiple Processor Bus Tracings for Enable Study of Multiprocessor Multi-Bus Computer Systems", all of which are incorporated herein by reference.

BACKGROUND OF THE INVENTION

1. Technical Field of the Invention

This invention relates generally to methods of predicting the performance of a cache memory in a computer system, and more specifically, to methods of predicting the performance of a cache memory in a proposed computer system having a proposed computer system architecture and configuration.

2. Description of the Prior Art

Modern computer systems can have a wide variety of computer architectures and configurations. To optimize efficiency, a computer system should have an architecture and configuration that is suitable for an expected load. If the architecture or configuration is excessive for a particular load, some of the computer resources will be wasted. If the architecture or configuration is not sufficiently robust for a particular load, the computer system will not provide adequate performance.

A high performance desktop computer designed for multi-media or graphical applications often has a standard PC architecture, with a relatively large amount of Random Access Memory (RAM), large hard drives, and one or more processors with fairly high clock rates. Multi-media and graphical applications are often computational and/or memory intensive, thereby requiring relatively large amount of memory and processing capability. In contrast, a desktop computer system designed for office use may have a standard PC architecture, but will often have far less RAM, a smaller hard drive and a single processor with less performance. The reduced computer resources of office type systems is appropriate because of the fairly light load of many office applications such as word processing.

For more complex computer systems, such as on-line transaction processing systems, both the architecture and the configuration of the computer system are often designed to accommodate the expected load. The overall throughput of such systems is often dependent on a number of inter-related factors including, for example, the overall architecture of the computer system, the configuration of the computer resources with the architecture, and the expected load and load type.

The architecture of a computer system may include, for example, the location of cache memory, the number of cache memory levels, the location of main memory, the location of processors within the system, the internal bus structure, the I/O structure, as well as other architectural details. The configuration of computer resources within the architecture may include, for example, the size and speed of each level of cache memory, and the number and speed of the processors.

The expected load should be taken into account when designing a computer system, and in particular, when selecting an architecture and/or configuration for the computer system. During the development of a computer system, the developer typically has some idea of the expected load for the system. Often, the expected load for the computer system is estimated by examining the software that will be run on the system. To help design a robust computer system that can efficiently handle the expected loads, it is important for the developer to have some way of evaluating the performance of a proposed computer system based on the expected load, before the system is actually completely developed. This may allow the developer to evaluate many different computer architecture and/or configurations before selecting a particular architecture and/or configuration for the particular application.

A primary way for a developer to evaluate and predict computer system performance is to develop computer performance models. Such models have traditionally been developed using either probabilistic evaluation (analytic models) or discrete event simulation programs (simulation models).

An analytic model is often defined to be a model that accepts moment estimators (such as mean arrival and service times) as its input and, using a closed form or iterative method, produces moment estimators for the desired statistics (such as average wait time). Analytic modeling has proven to be applicable in a wide range of computer system performance evaluation problems, and is the primary method used commercially today.

There are some fundamental drawbacks to analytic modeling. One drawback is that not all discrete systems can be evaluated in this manner. Furthermore, direct measurements have shown that many computer systems seriously violate the underlying assumptions of analytic models. Cache memory systems have presented a particular problem because of the large quantity and diverse nature of today's cache memory workloads, which create arrival and service distributions which are not only extremely variable, but do not conform to those conventionally assumed for these models. Thus, such models provide severely limited results, which limits the ability of a developer to predict the performance of different cache memory configurations in a proposed computer system. Also, the actual distributions of the analytic modeling parameters often must be simplified, which further compromises the accuracy of the results.

Simulation models are primarily useful in studying computer performance at a high level of detail. A simulation model may be defined to be a model which accepts a set of measured or generated events (such as arrival or service requests) as its input and produces performance data corresponding thereto. Unfortunately, the processing requirements needed to run the simulations is related to the level of detail of such models. Because many of today's systems are very large and complex, detailed simulation is rarely used commercially because of the inordinate amount of processing time required to produce performance data. Also, and as is the case for analytic modeling, the ability of simulation models to predict the performance of different cache memory configurations is severely limited because of the large quantity and diverse nature of modern day cache memory workloads.

Statistical techniques have also been used to augment and assist conventional analytic and simulation approaches, and also to aid in their evaluation. For example, statistical techniques have been used to provide a sub-model portion of, for example, an overall cache memory simulation model. While such usage of statistical modeling offers the possibility of reducing the complexity and processor requirements of some simulation models, it often does not reduce the simulations times to desirable levels unless the sub-models are oversimplified, which results in reduced accuracy.

Performance projections for processors and memory sub-systems are often critically dependent upon a correct understanding of the workloads which are imposed on such systems. In order to accurately predict the performance of a proposed system to assist in selecting among the various design tradeoffs, some prior art systems collect instruction streams (i.e., "traces") that statistically represent actual workloads. By using traces that represent a fixed workload as input to a system model that allows variations on some hardware parameters, such as the number of processors, some developers hope to predict performance for that workload versus the number of processors.

A limitation of using representative trace data is that the traces can become very large, even for fairly simple instruction streams. A number of methods for minimizing the length of the trace data are disclosed in, for example, U.S. patent application Ser. No. 09/747,050, filed Dec. 21, 2000, entitled "System and Method for High Speed, Low Cost Address and Bus Signal Tracing", U.S. patent application Ser. No. 09/745,813, filed Dec. 21, 2000, entitled "High Speed Processor Interconnect Tracing Compaction Using Selectable Triggers", and U.S. patent application Ser. No. 09/747,046, filed Dec. 21, 2000, entitled "Coordination of Multiple Processor Bus Tracings for Enable Study of Multiprocessor Multi-Bus Computer Systems", all of which are assigned to the assignee of the present invention and all of which are incorporated herein by reference. Even using these methods, however, the size of the trace data can become large, particularly for systems that have a relatively large number of processors and/or a relatively large cache memory.

SUMMARY OF THE INVENTION

The present invention overcomes many of the disadvantages of the prior art by providing methods and systems for efficiently predicting the performance of a proposed cache memory within a proposed computer system. This is preferably accomplished by first measuring a number of actual cache memory performance values using two or more actual computer systems with known cache memory sizes and known processing capabilities. Each of the average actual cache memory performance values is preferably measured using a common predetermined set of instructions.

Once a sufficient number and variety of average actual cache memory performance values are measured, a predicted average cache memory performance value is calculated for a proposed cache memory size. This is preferably accomplished by extrapolating from selected average actual cache memory performance values.

In some systems, such as multi-processor systems, the predicted average cache memory performance value depends on a number of factors including, for example, the size of the proposed cache memory and the processing capability of the proposed computer system. For example, as the proposed cache memory size increases, the load on the cache memory tends to decrease, which increases the performance of the cache memory. Likewise, as the processing capability of a proposed computer system configuration increases, the load on the cache memory tends to increase, which decreases the performance of the cache memory. Thus, it is often desirable to measure average actual cache memory performance values using actual computer systems that have a variety of cache memory sizes and processing capabilities.

Once a sufficient number and variety of average actual cache memory performance values have been measured, a regression analysis may be performed to identify the sensitivity of the average actual cache memory performance values as a function of, for example, cache memory size and processing capability. One way of performing this regression analysis is to fit the average actual cache memory performance values for each processing capability to a separate curve. Each curve then relates the average cache memory performance value for a particular processing capability to cache memory size.

Under some circumstances, it may be desirable to adjust selected curves so that the curves collectively agree with known theoretical relationships. Without this step, some of the curves may produce a result that does not make intuitive sense. For example, it is known that the curves should collectively show that for a particular cache memory size, the average cache memory performance value should slow as the processing capability of the computer system increases. This makes intuitive sense because the increased processing capability tends to increase the load on the cache memory, which reduces the performance of the cache memory. Therefore, if one or more of the curves predict a result that does not agree with this expected theoretical relationship, the curves should be refit or otherwise adjusted so that the expected theoretical relationships are followed.

To make the curve fitting and curve adjusting simpler and more intuitive, it may be beneficial to perform a data transformation on one or more of the variables. In one illustrative embodiment, both the cache memory size and the number of processors are subject to a log (base 2) data transformation.

In one illustrative embodiment, the cache memory performance values represent cache misses. In this embodiment, the average actual cache memory performance value that is measured for each of the two or more actual computer systems may correspond to the average number of cache Misses Per Instruction (MPI) over the predetermined set of instructions. Under many circumstances, the MPI metric has been found to be a relatively good gauge of performance for a cache memory. When using this metric, the predicted average cache memory performance value for the proposed computer system may correspond to the average number of cache Misses Per Instruction (MPI) at the proposed cache memory size.

Many cache memories are accessed using a number of cache memory request types. Some illustrative cache memory request types include, for example, instruction fetch requests for fetching instructions, data read requests without ownership for fetching data without ownership, data read requests with ownership for fetching data with ownership, ownership requests for requesting ownership, and/or one or more cache management functions or requests.

It has been found that the performance of the cache memory can vary significantly from one cache memory request type to another. Therefore, to increase the accuracy of the predicted cache memory performance, the various contributions for the various cache memory request types may be individually considered. Preferably, an average actual cache memory performance value is measured for each of the cache memory request types using two or more actual computer systems having a variety of cache memory sizes and processing capabilities. Then, a predicted cache memory performance value can be determined for each of the cache memory request types for a proposed cache memory size. This may be accomplished by extrapolating from selected average actual cache memory performance values for corresponding request types.

Cache management functions can also significantly effect cache memory performance. One of the cache management functions that is commonly used in multi-processor systems is a cache hit-return function. A cache hit-return function is issued when a first processor attempts to read a location in a cache memory while a second processor has ownership. The cache hit-return function causes the second processor to return the data to the cache memory so that the first processor can access the location. Another cache management function that is commonly used is a cache flush function. A cache flush function is issued when at least a portion of the data stored in a cache memory is flushed from the cache memory to make room for new data. In some cases, at least a portion of the data that is flushed is written back to a main memory. The cache flush function manages this operation. It is recognized that these are only illustrative cache management functions, and other cache management functions may be used to manage the operation of a cache memory.

To properly gauge the performance of a cache memory, such cache management functions may be separately addressed. This may be accomplished by measuring an average actual cache memory performance value for each cache management function. Then, a predicted cache performance value can be predicted for each cache management function at a proposed cache memory size by extrapolating from the actual cache memory performance values. Like above, it may be desirable to adjust selected predicted cache memory performance values for the various the cache memory request types and/or cache management functions to agree with known theoretical relationships.

Once all of the desired predicted average cache memory performance values have been calculated for a proposed cache memory size, the overall performance of the proposed cache memory can be estimated by combining the various predicted average cache memory performance values. Preferably, the predicted average cache memory performance values for each of the cache memory request types and/or cache management functions are weighted in accordance with the number of times each will be executed during the execution of the predetermined set of instructions.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 4 is a chart showing measured (X) and projected (+) average cache memory performance values across various cache memory sizes and various numbers of processors.

DETAILED DESCRIPTION OF THE PREFERRED EMBODIMENTS

Figure 1:
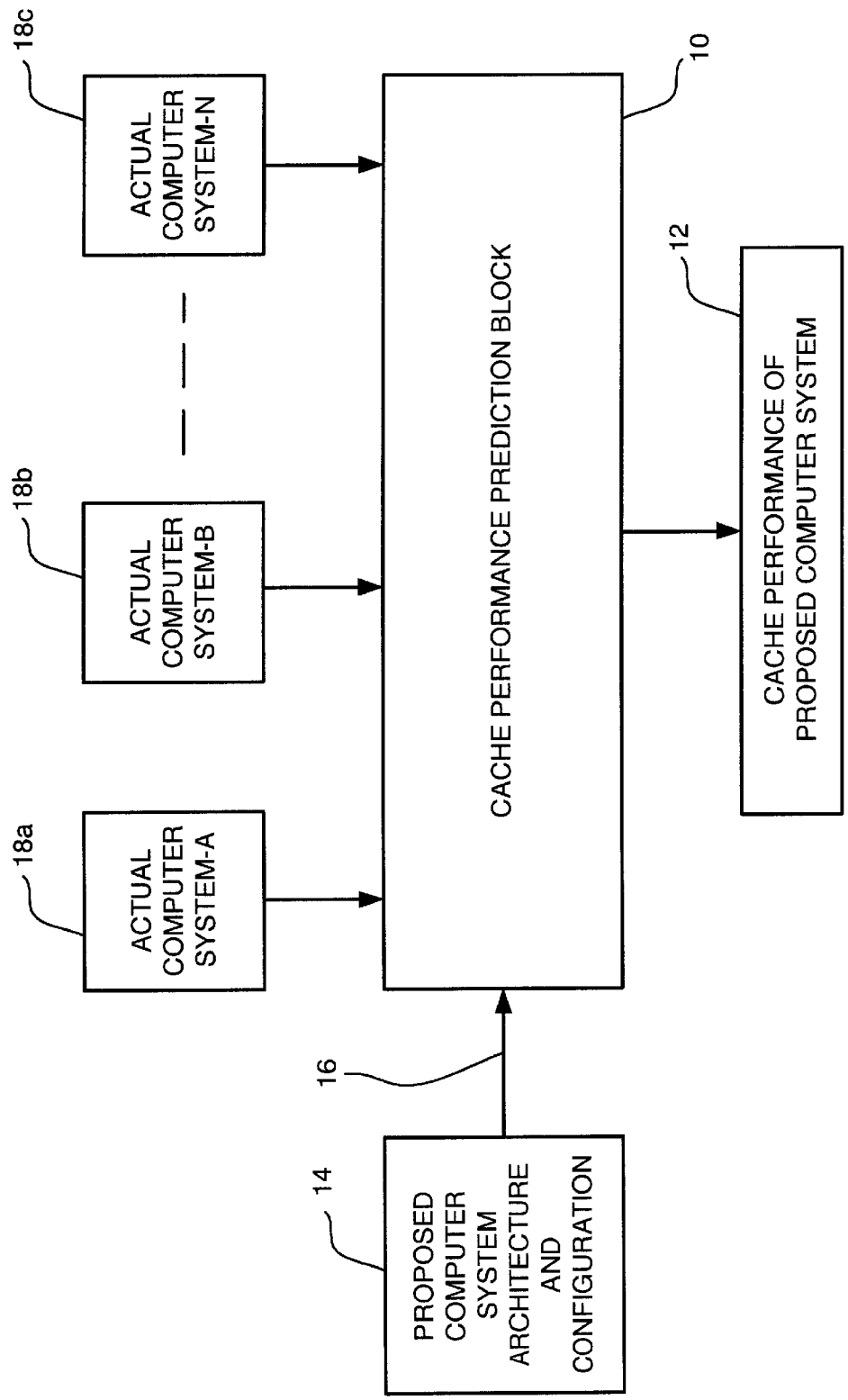
FIG. 1 is a high level block diagram of an illustrative embodiment of the present invention.

FIG. 1 is a high level block diagram showing an illustrative embodiment of the present invention. The illustrative embodiment includes a cache performance prediction block 10 that predicts the cache performance of a proposed cache memory within a proposed computer system, as shown at 12. The proposed computer system is preferably specified in a proposed computer system architecture and configuration specification 14, which is provided to the cache performance prediction block 10 via interface 16.

To help predict the cache performance of a proposed cache memory within a proposed computer system, the cache performance prediction block 10 preferably accepts actual measured cache performance values from two or more actual computer systems, schematically shown at 18a–18c, each with a different cache memory size and/or processing capability. The actual measured cache performance values are preferably average cache performance values such as Misses Per Instruction (MPI) measured while executing a predetermined set of instructions, such as instructions that corresponds to a TPC benchmark.

As indicated above, the expected load of a computer system and thus expected load of the cache memory may depend on the software that will be run on the proposed system. Thus, to take any software effects into account, the predetermined set of instructions should be selected to reflect the load that is expected to run on the proposed computer system. When so selected, the measured cache performance values will tend to reflect the actual cache performance under expected operating conditions.

The term "cache memory" as used herein is meant to include any memory element or device that functions as a cache. For example, the term "cache memory" can refer to first-, second-, third-, or even Nth-level cache memories (where N is an integer greater than 0), which in many computer architectures, are either directly or indirectly coupled to one or more processors. In addition, however, the term "cache memory" can refer to, for example, a main memory module, which in many computer architectures, can function as a cache between an Nth-level cache memory and a disk or other large storage device.

Once a sufficient number and variety of average actual cache memory performance values are measured and provided to the cache performance prediction block 10, the cache performance prediction block 10 calculates a predicted average cache memory performance value for the proposed cache memory size for the proposed computer system specified in the proposed computer system architecture and configuration specification 14. This is preferably accomplished by extrapolating from selected average actual cache memory performance values, as further described below.

In some systems, such as multi-processor systems, the predicted average cache memory performance value will depend on a number of factors including, for example, the size of the proposed cache memory and the processing capability of the proposed computer system. For example, as the proposed cache memory size increases, the load on the cache memory tends to decrease, which increases the performance of the cache memory. Likewise, as the processing capability of a proposed computer system configuration increases, the load on the cache memory tends to increase, which decreases the performance of the cache memory. Thus, it is often desirable to provide actual computer systems 18a–18c that have a variety of cache memory sizes and processing capabilities.

Figure 2:
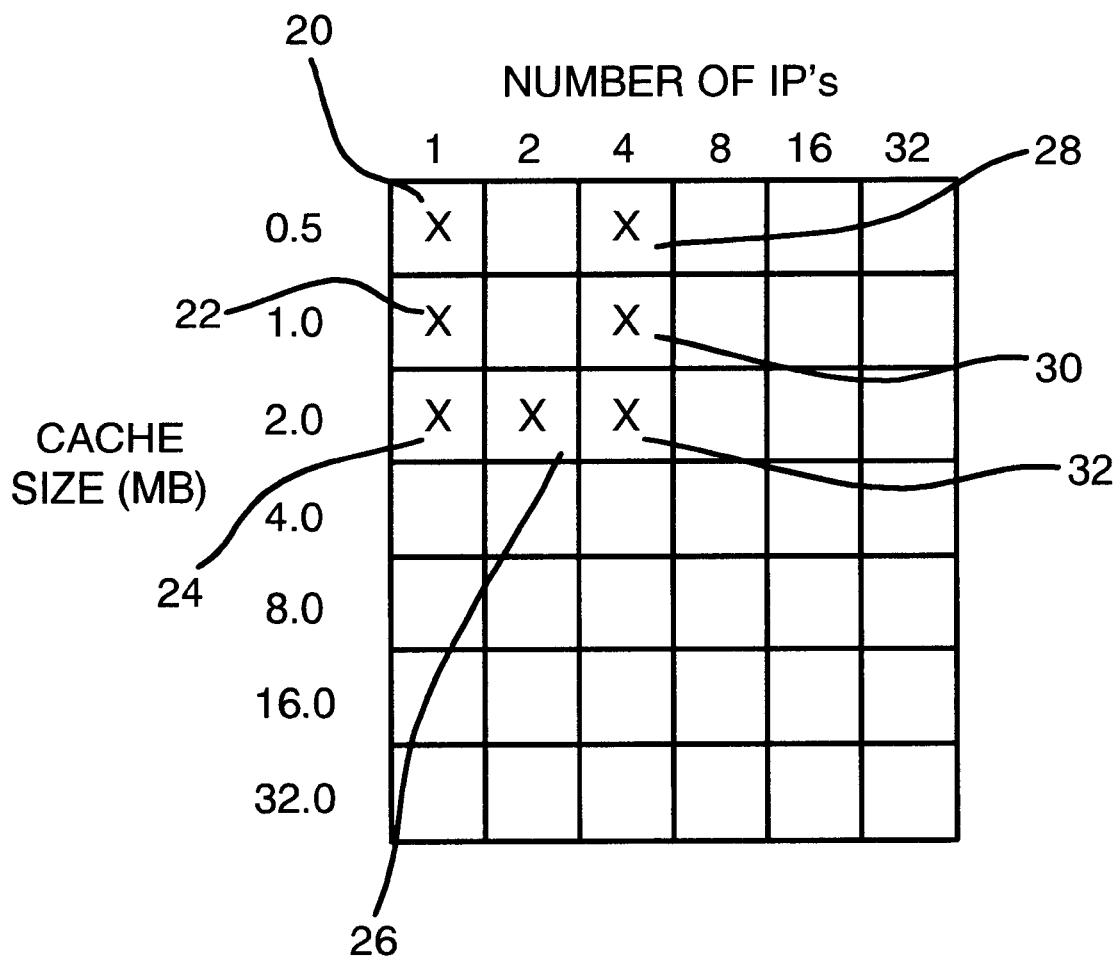
FIG. 2 is a chart showing an illustrative set of average actual cache memory performance values measured using actual computer systems that have various cache memory sizes and various numbers of processors.

FIG. 2 is a chart showing an illustrative set of average actual cache memory performance values that may be measured using several actual computer systems 18a–18c, each having a different combination of cache memory size and numbers of processors. In the example shown, average actual cache memory performance values, such as MPI, are measured on three computer systems having a single processor; one with 0.5 MB of cache memory, one with 1.0 MB of cache memory, and one with 2 MB of cache memory. These actual measured MPI values are shown at 20, 22 and 24.

Another average actual cache memory performance value (e.g., MPI) is measured using an actual computer system that has two processors and 2 MB of cache memory, as shown at 26. Finally, average actual cache memory performance values (e.g., MPI) are measured on three more computer systems having four processors; one with 0.5 MB of cache memory, one with 1.0 MB of cache memory, and one with 2 MB of cache memory. These actual measured MPI values are shown at 28, 30 and 32.

Once a sufficient number and variety of average actual cache memory performance values (e.g., MPI) have been measured, a regression analysis may be performed to identify the sensitivity of the average actual cache memory performance values as a function of, for example, cache memory size and processing capability. One way of performing this regression analysis is to fit the average actual cache memory performance values for each processing capability to a separate curve. Each curve then relates the average cache memory performance value for a particular processing capability to cache memory size.

Figure 3:
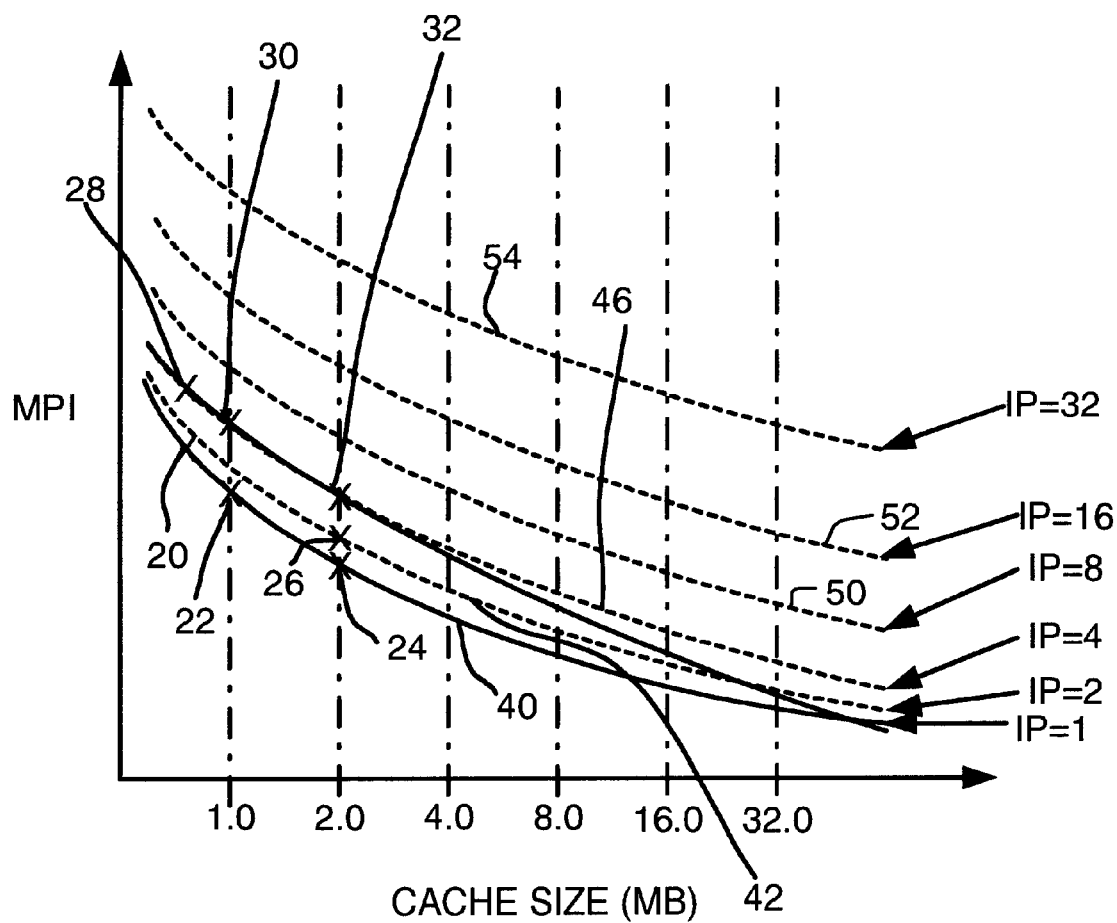
FIG. 3 is a chart showing the average actual cache memory performance values for each of the various number of processors shown in FIG. 2 fitted to a curve versus cache memory size.

FIG. 3 is a chart showing the average actual cache memory performance values for each of the various number of processors shown in FIG. 2 fitted to a curve versus cache memory size. The average actual cache memory performance values (e.g., MPI) that were measured using the three computer systems having a single processor are plotted at 20, 22 and 24, and fitted to a curve 40. The average actual cache memory performance value (e.g., MPI) measured using the computer system having two processors is plotted at 26, and fitted to a curve 42. Finally, the average actual cache memory performance values (e.g., MPI) measured using the three computer systems having four processor are plotted at 28, 30, and 32, and fitted to a curve 44.

Under some circumstances, it may be desirable to adjust selected curves so that the curves collectively agree with known or expected theoretical relationships. Without this step, some of the curves may produce a result that does not make intuitive sense. For example, it is known that the curves should collectively show that for a particular cache memory size, the average cache memory performance value should slow as the processing capability of the computer system increases. This makes intuitive sense because the increased processing capability tends to increase the load on the cache memory, which reduces the performance of the cache memory. Therefore, if one or more of the curves predict a result that does not agree with this expected theoretical relationship, the curves should be refit or otherwise adjusted so that the expected theoretical relationships are followed.

In the illustrative embodiment, curve 44, which corresponds to the average actual cache memory performance values (e.g., MPI) measured for the three computer systems having four processor, crosses curves 42 and 40 when the cache memory size exceeds about 16 MB. This, however, does not make intuitive sense because it is known that the curves should collectively show that for a particular cache memory size (e.g., 32 MB), the average cache memory performance value should slow as the processing capability of the computer system increases. Therefore, it is desirable to refit or adjust curve 44 so that the curves collectively agree with known or expected theoretical relationships. A corrected or refit curve is shown at 46. Curves 50, 52 and 54 are projected by extrapolating from curves 40, 42 and 46, and correspond to computer systems having 8, 16 and 32 processors, respectively.

To make the curve fitting and curve adjusting simpler and more intuitive, it may be beneficial to perform a data transformation on one or more of the variables. In the illustrative embodiment of FIG. 3, the cache memory size (X-axis) is subject to a log (base 2) data transformation. It is also contemplated that the number of processors may be subject to a log (base 2) data transformation, if desired.

Once curves 40, 42, 46, 50, 52 and 54 have been satisfactorily generated and refit or adjusted as needed, a projected average cache memory performance value (e.g. MPI) may be calculated for any combination of cache memory size and processing capability. FIG. 4 is a chart showing measured (X) and projected (+) average cache memory performance values across various cache memory sizes and various numbers of processors. Such a chart may be generated with each of the values stored in a lookup table or the like, or the values may be generated on the fly on an as needed basis. It is contemplated that the projected average cache memory performance values may be used to help project the overall performance of a proposed computer system.

Many cache memories are accessed using a number of cache memory request types. For example some cache memories are accessed by, for example, instruction fetch requests for fetching instructions, data read requests without ownership for fetching data without ownership, data read requests with ownership for fetching data with ownership, ownership requests for requesting ownership, and/or one or more cache management functions or requests.

It has been found that the performance of the cache memory can vary significantly from one cache memory request type to another. Therefore, to increase the accuracy of the predicted cache memory performance, the various contributions for the various cache memory request types may be individually considered. Preferably, an average actual cache memory performance value is measured for each of the cache memory request types using two or more actual computer systems having a variety of cache memory sizes and processing capabilities, similar to that described above. Then, a predicted cache memory performance value can be determined for each of the cache memory request types for a proposed cache memory size. This may be accomplished by, for example, extrapolating from selected average actual cache memory performance values for corresponding request types.

Figure 5:
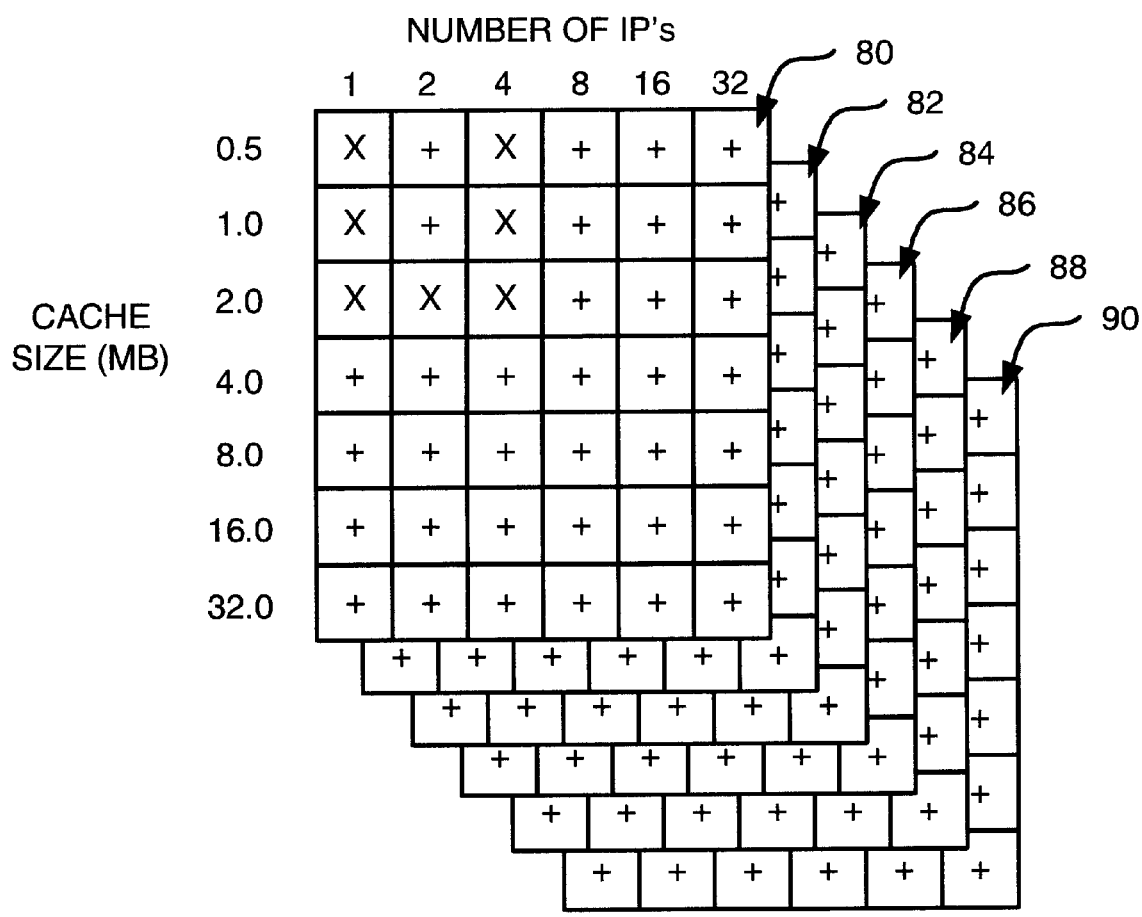
FIG. 5 is a chart showing measured (X) and projected (+) average cache memory performance values for each of several cache memory request types across various cache memory sizes and various numbers of processors.

FIG. 5 is a chart showing measured (X) and projected (+) average cache memory performance values for each of several cache memory request types across a number of cache memory sizes and a number of processors. A first table 80 shows measured (X) and projected (+) average cache memory performance values for instruction fetch requests. The measured (X) average cache memory performance values shown in table 80 preferably reflect the measured performance of the cache memory when instruction fetch requests are provided to the cache memory of the corresponding actual computer system. This can be accomplished by, for example, maintaining an MPI rate for all instruction fetch requests presented to the cache memory. The projected (+) average cache memory performance values of table 80 are preferably generated in the same way as described above with respect to FIG. 3 and FIG. 4.

A second table 82 shows measured (X) and projected (+) average cache memory performance values for data read without ownership requests. Again, the measured (X) average cache memory performance values shown in table 82 preferably reflect the measured performance of the cache memory when data read without ownership requests are provided to the cache memory of the corresponding actual computer system. This can be accomplished by, for example, maintaining an MPI rate for all data read without ownership requests presented to the cache memory. The projected (+) average cache memory performance values of table 82 are preferably generated in the same way as described above with respect to FIG. 3 and FIG. 4. Tables 84 and 86 show measured (X) and projected (+) average cache memory performance values for ownership requests, and data read with ownership requests, respectively.

Cache management functions can also significantly effect cache memory performance. One cache management function that is commonly used in multi-processor systems is a cache hit-return function. A cache hit-return function is issued when a first processor attempts to read a location in a cache memory while a second processor has ownership. The cache hit-return function causes the second processor to return the data to the cache memory so that the first processor can access the location. Another cache management function that is commonly used is a cache flush function. A cache flush function is issued when at least a portion of the data stored in a cache memory is flushed from the cache memory to make room for new data. In some cases, at least a portion of the data that is flushed is written back to a main memory. The cache flush function manages this operation. It is recognized that these are only illustrative cache management functions, and other cache management functions may be used to manage the operation of a cache memory.

To properly access the performance of a cache memory, such cache management functions may be separately addressed. This may be accomplished by measuring an average actual cache memory performance value for each cache management function. Then, a predicted cache performance value can be predicted for each cache management function at a proposed cache memory size by extrapolating from the actual cache memory performance values. Tables 88 and 90 show measured (X) and projected (+) average cache memory performance values for cache hit-return functions and cache flush functions, respectively.

It may be desirable to adjust selected predicted cache memory performance values of FIG. 5 for the various the cache memory request types and/or cache management functions to agree with known theoretical relationships. One known theoretical relationship is that the sum of the predicted cache memory performance values for the DATA READ WITH OWNERSHIP and the OWNERSHIP REQUEST types should approximately equal the sum of the predicted cache memory performance values for THE CACHE HIT RETURN FUNCTION and the CACHE FLUSH FUNCTION. The relaxation of equality may account for infrequency exception conditions. Another known theoretical relationship is that the predicted cache memory performance value for THE CACHE HIT RETURN FUNCTION divided by the sum of the predicted cache memory performance values for the DATA READ WITH OWNERSHIP and the DATA READ WITHOUT OWNERSHIP request types should be less than or equal to one. If either of these theoretical relationships fail, the curves may be refit or otherwise adjusted.

Once all of the desired predicted average cache memory performance values have been calculated for a proposed cache memory size, the overall performance of the proposed cache memory may be estimated by combining the various predicted average cache memory performance values. Preferably, the predicted average cache memory performance values for each of the cache memory request types and/or cache management functions are weighted in accordance with the number of times each are executed during the execution of the predetermined set of instructions.

Having thus described the preferred embodiments of the present invention, those of skill in the art will readily appreciate that the teachings found herein may be applied to yet other embodiments within the scope of the claims hereto attached.

What is claimed is:

1. A method for predicting the performance of a cache memory in a proposed computer system configuration, the proposed computer system configuration having a proposed cache memory size and a proposed processing capability, the method comprising:

obtaining an average actual cache memory performance value for each of two or more actual computer systems, wherein each actual computer system has a selected cache memory size and a selected processing capability, the average actual cache memory performance value for each actual computer system being measured while executing a predetermined set of instructions; and determining a predicted average cache memory performance value for the proposed cache memory size of the proposed computer system configuration using selected average actual cache memory performance values of the at least two actual computer systems.

2. A method according to claim 1, wherein the determining step includes the step of extrapolating from selected average actual cache memory performance values for the at least two actual computer systems to determine the predicted average cache memory performance value for the proposed cache memory size of the proposed computer system configuration.

3. A method according to claim 1, wherein the predicted average cache memory performance value is dependent on both the proposed cache memory size and the proposed processing capability of the proposed computer system configuration.

4. A method according to claim 3, wherein at least two of the actual computer systems have different cache memory sizes, and at least two of the actual computer systems have different processing capabilities.

5. A method according to claim 4, further comprising the step of fitting the average actual cache memory performance values for those actual computer systems that have a given processing capability to a curve in an average cache memory performance value versus cache memory size domain, each curve relating the average cache memory performance value for a corresponding processing capability to cache memory size.

6. A method according to claim 5, further comprising the step of performing a data transformation on the cache memory size and/or processing capability of the actual computer systems before performing the fitting step, the data transformation including a log (base 2) transformation.

7. A method according to claim 5, further comprising the step of adjusting the curves so that the curves adhere to a number of expected theoretical relationships between the average cache memory performance value, the cache memory size and the processing capability of the actual computer systems.

8. A method according to claim 7, wherein one of the expected theoretical relationships is that for a particular cache memory size, the average cache memory performance value should be slower as the processing capability of the computer system increases.

9. A method according to claim 5, wherein the average actual cache memory performance value that is determined for each of the two or more actual computer systems is an average number of cache Misses Per Instruction (MPI) for the predetermined set of instructions.

10. A method according to claim 9, wherein the predicted average cache memory performance value for the proposed computer system configuration is also an average number of cache Misses Per Instruction (MPI) for the predetermined set of instructions.

11. A method for predicting a number of cache memory performance values of a proposed computer system configuration, the proposed computer system configuration having a cache memory with a proposed cache memory size and a proposed processing capability, the cache memory being accessed by a number of cache memory request types, each of the number of cache memory performance values relating to a corresponding one of the number of cache memory request types, the method comprising:
obtaining an average actual cache memory performance value for each of the number of cache memory request types on each of two or more actual computer systems, wherein each actual computer system has a selected cache memory size and a selected processing capability, the average actual cache memory performance value for each of the number of cache memory request types being measured while executing a predetermined set of instructions; and
determining a predicted cache memory performance value for each of the cache memory request types for the proposed cache memory size of the proposed computer system configuration using selected average actual cache memory performance values of the at least two actual computer systems.

12. A method according to claim 11, wherein one of the cache memory request types is an instruction fetch request.

13. A method according to claim 11, wherein one of the cache memory request types is a data read without ownership request.

14. A method according to claim 11, wherein one of the cache memory request types is a data read with ownership request.

15. A method according to claim 11, wherein one of the cache memory request types is an ownership request.

16. A method according to claim 11, wherein one or more of the cache memory performance values correspond to one or more cache management functions.

17. A method according to claim 16, further comprising the steps of:
obtaining an average cache memory performance value for each of two or more actual computer systems for each of the cache management functions, each actual computer system having a different combination of cache memory size and processing capability, the average cache memory performance values for each cache management functions determined by monitoring each of the cache management functions while executing the predetermined set of instructions on the two or more actual computer systems; and
extrapolating from the average cache memory performance values of the cache management functions to determine the cache memory performance values for each of the cache management functions of the proposed computer system configuration that has the proposed cache memory size and the proposed processing capability.

18. A method according to claim 16, wherein one of the cache management functions is a cache hit-return function, which results when a first processor attempts to read a location of a cache memory while a second processor has ownership, and the second processor must return data to the cache memory before the first processor can access the location.

19. A method according to claim 16, wherein one of the cache management functions is a cache flush function, which results when at least a portion of the data stored in a cache memory is flushed from the cache memory.

20. A method according to claim 19, wherein at least a portion of the data that is flushed is written back to a main memory.

21. A method according to claim 16 further comprising the step of adjusting the cache memory performance values for selected cache memory requests and selected cache management functions so that the cache memory performance values adhere to a number of expected theoretical relationships between the cache memory performance values of selected cache memory requests and selected cache management functions.

22. A method according to claim 21, wherein the cache memory requests include a DATA READ WITH OWNERSHIP request and an OWNERSHIP REQUEST.

23. A method according to claim 22, wherein the cache management functions include a CACHE HIT RETURN FUNCTION and a CACHE FLUSH FUNCTION.

24. A method according to claim 23 further comprising the steps of:
checking to see if the sum of the predicted cache memory performance values for the DATA READ WITH OWNERSHIP and the OWNERSHIP REQUEST types approximately equal the sum of the predicted cache memory performance values for THE CACHE HIT RETURN FUNCTION and the CACHE FLUSH FUNCTION, and adjusting the predicted cache memory performance values if not substantially equal.

25. A method according to claim 23 further comprising the steps of:
checking to see if the predicted cache memory performance value for THE CACHE HIT RETURN FUNCTION divided by the sum of the predicted cache memory performance values for the DATA READ WITH OWNERSHIP and the DATA READ WITHOUT OWNERSHIP request types is less than or equal to one, and adjusting the predicted cache memory performance values if not less than or equal to one.

26. A method for predicting a cache memory performance value of a proposed computer system configuration, the proposed computer system configuration having a proposed cache memory size and a proposed number of processors, the method comprising:

obtaining an average actual cache memory performance value for each of two or more actual computer systems, each actual computer system having a different combination of cache memory size and number of processors, the average actual cache memory performance value determined by monitoring the cache memory performance while executing a predetermined set of instructions; and determine a predicted cache memory performance value for the proposed computer system configuration by extrapolating from selected average actual cache memory performance values of selected actual computer systems.

27. A method according to claim 26, further comprising the step of fitting the average actual cache memory performance values for those actual computer systems that have a given processing capability to a curve in an average cache memory performance value versus cache memory size domain, each curve relating the average cache memory performance value for a corresponding processing capability to cache memory size.

28. A method according to claim 27, further comprising the step of performing a data transformation on the cache memory size and/or processing capability of the actual computer systems before performing the fitting step, the data transformation including a log (base 2) transformation.

29. A method according to claim 27, further comprising the step of adjusting the curves so that the curves adhere to a number of expected theoretical relationships between the average cache memory performance value, the cache memory size and the processing capability of the actual computer systems.

30. A method according to claim 29, wherein one of the expected theoretical relationships is that for a particular cache memory size, the average cache memory performance value should be slower as the processing capability of the computer system increases.

* * * * *